United States Patent [19]

Skaggs

[11] 3,955,542
[45] May 11, 1976

[54] WATER INJECTOR VALVE AND REGULATOR
[76] Inventor: William Dale Skaggs, 1572 Belle, San Bernardino, Calif. 92404
[22] Filed: Nov. 8, 1974
[21] Appl. No.: 522,029

[52] U.S. Cl. .............................. 123/25 L; 137/515
[51] Int. Cl.² ........................................ F02D 19/00
[58] Field of Search ............. 123/25 R, 25 A, 25 L, 123/25 B, 119 D; 137/515, 511, 539

[56] References Cited
UNITED STATES PATENTS

| | | | |
|---|---|---|---|
| 1,360,960 | 11/1920 | Kudla | 137/515 X |
| 1,397,780 | 11/1921 | Pohl | 123/25 L X |
| 1,472,438 | 10/1923 | Rader | 123/25 L |
| 1,525,621 | 2/1925 | Schaurak | 123/25 B X |
| 1,532,638 | 4/1925 | Rodgers | 123/25 L |
| 1,539,560 | 5/1925 | Harmon | 123/25 L |
| 1,613,789 | 1/1927 | Devary | 123/25 L |
| 2,896,663 | 7/1959 | Mena | 137/539 |
| 3,442,288 | 5/1969 | Scaramucci | 137/515 |
| 3,791,406 | 2/1974 | Phillipps | 137/539 |
| 3,875,922 | 4/1975 | Kirmass | 123/25 R |

Primary Examiner—Charles J. Myhre
Assistant Examiner—Ira S. Lazarus
Attorney, Agent, or Firm—William C. Babcock

[57] ABSTRACT

A device that is in communication with the air intake valve of a carburetor of an internal combustion engine to inject a mist of water into the air fuel mixture formed by the carburetor, which water when in the zone of combustion in the engine reacts with carbon monoxide and free carbon therein to form carbon dioxide and hydrogen. The hydrogen so formed reacts with oxygen in the air-fuel mixture to form water that is either discharged in the exhaust from the engine or reacts with additional carbon dioxide and carbon in the zone of combustion to produce further carbon dioxide and hydrogen that continues until the carbon dioxide and water are discharged in the exhaust from the engine. The device when operating not only lowers the content of carbon-monoxide in the exhause discharged from the engine, but also tends to remove and minimize the depositing of carbon on spark plugs and in the cylinders of the engine.

3 Claims, 3 Drawing Figures

WATER INJECTOR VALVE AND REGULATOR

BACKGROUND OF THE INVENTION

1. Field of the Invention

Internal combustion engine anti-pollution device.

2. Description of the Prior Art

For many years it has been realized that internal combustion engines run more smoothly and operate more efficiently in the evening than during the day. This improved performance of an internal combustion engine in the evening is due to the increased moisture content of the air that mixes with the fuel in the carburetor, and this moisture in the form of water vapor reacting with carbon monoxide and free carbon in the zone of combustion in the engine impart improved operating characteristics to the engine by providing more complete combustion of the fuel.

From time to time in the past various devices have been used in an attempt to add water to the air fuel mixture of an internal combustion engine in an attempt to reproduce the conditions that occur naturally in the evening or night when an engine is operated. These devices have the operational disadvantage that they are bulky, unduly complicated, and uncertain in operation.

The primary purpose in devising the present invention is to supply a device for automatically injecting a mist of water into the air intake of a carburetor, which injection takes place only when a PUC valve operatively associated with the air intake is in an open condition to vent fumes from the crankcase to the air intake.

Another object of the invention is to supply a device that is of simple structure, can be fabricated from commercially available materials, is easy to install, is automatic in operation and is substantially maintenance free.

A still further object of the invention is to supply a device which when operating and discharging water in the form of a mist into the air intake of a carburetor improves the operation of the engine with which the device is associated by the water in the form of vapor in the zones of combustion reacting with carbon monoxide and free carbon to transform the last mentioned two materials into carbon dioxide and hydrogen, with the hydrogen subsequently combining with oxygen in the air of the air-fuel mixture to form additional water which further reacts with carbon monoxide to produce carbon dioxide and additional hydrogen.

SUMMARY OF THE INVENTION

The invention includes a vented reservoir for water that has an opening in the lower portion thereof from which a first tube extends. A housing assembly is provided that includes an elongate cylindrical cup that has a first closed end and a second end that is open. The first closed end has a first opening therein that is in communication with said first tube.

A cap is provided that removably closes the second end of the housing, and the cap having a second opening therein. The second opening of the cap is in communication with a second tube that is connected to the air intake of the carburetor on an internal combustion engine. Under present day operating conditions, this communication is effected by the second tube being connected to a line that has a PUC valve therein. The second tube is connected to the line between the PUC valve and the crankcase that is vented by the line to the air intake of the carburetor. An orifice defining plate is removably disposed inside the cap, with the orifice in the plate being in communication with the second opening.

A spring loaded valve occupies a fixed position in a confined space in the housing, and allows water to flow from the first tube to discharge through the orifice only when the air intake in the carburetor is such that the PUC valve opens, and at least a minimum negative pressure is impressed in the second tube.

The size of the orifice in the plate is so related to the differential in pressure between that in the interior of the valve and that exteriorly of the orifice defining plate that water discharges through the orifice as a tiny high velocity stream that disintegrates into a mist in the second tube, and this mist subsequently absorbing sufficient heat from air in the air-fuel mixture as to be in the form of vapor prior to reaching the zones of combustion in the internal combustion engine.

The water vapor when entering the zones of combustion in the engine combine with carbon monoxide and free carbon to form carbon dioxide and hydrogen, which hydrogen subsequently combines with oxygen in the air-fuel mixture in the combustion zone to form water.

The water so formed again combines with carbon monoxide and free carbon to reproduce the cycle above described, until such time as the water so formed is discharged from the engine as a part of the exhaust therefrom.

The water in transforming the carbon monoxide to carbon dioxide and hydrogen effects a more complete combustion of the air fuel mixture than normally occurs, and as a result the engine efficiency is increased and the quantity of pollutants discharged by the engine to the atmosphere being lowered due to at least a portion of the carbon monoxide normally present therein being previously transformed to harmless carbon dioxide.

The device in addition includes means for holding the spring loaded valve in a fixed position in a confined space in the housing. The orifice defining plate is removable from the housing in order that a plate having an orifice of an appropriate size for the particular operating characteristics of an engine may be inserted in the housing.

DESCRIPTION OF THE PREFERRED EMBODIMENT

Figure 1:
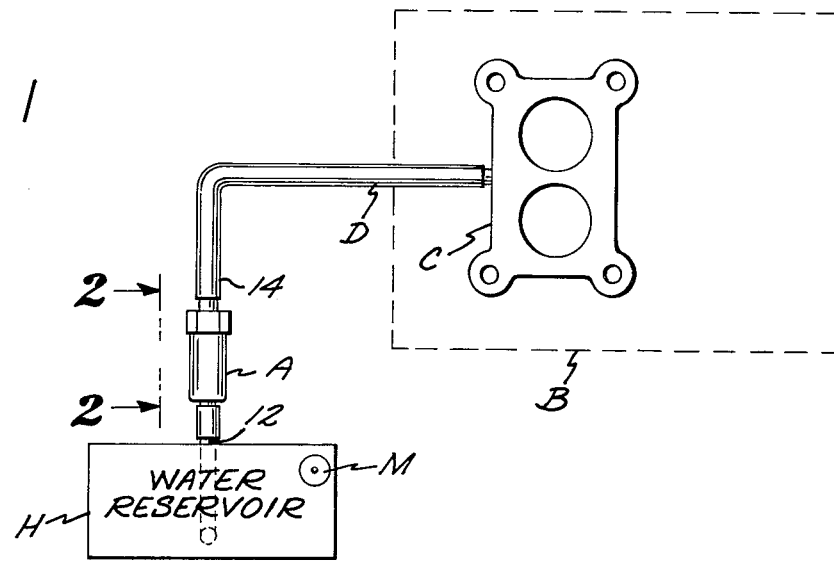
FIG. 1 is a diagrammatic view of the invention and illustrates its relative position to the air intake of a carburetor of an internal combustion engine, the PUC line that vents the crankcase to the air intake, and the water reservoir used in association with the invention.
Figure 2:
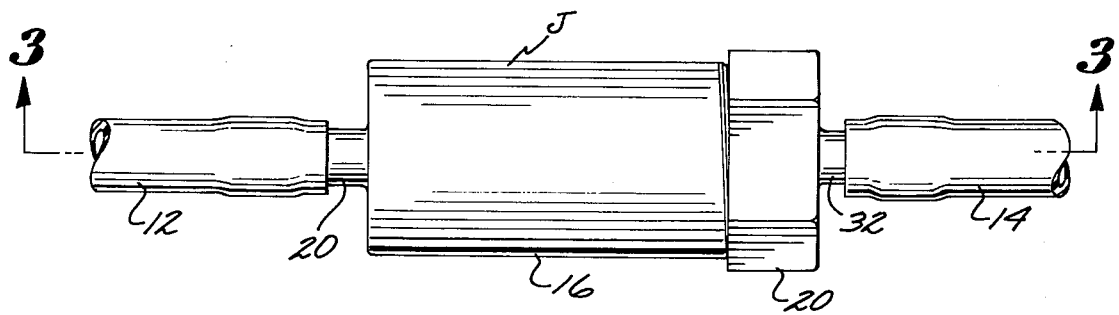
FIG. 2 is a side elevational view of the engine.

The invention A as may be seen in FIG. 1 is used on an internal combustion engine B that has the air intake of a carburetor C connected by a tubular line D to the crankcase E of the engine. The line D has a PUC valve F therein as required by anti-pollution laws now in effect in the United States. A tubular tee G is incorporated in the line D and is located between the crankcase E and valve F. A water reservoir H is provided that is mounted at a convenient location relative to the engine B. Reservoir H has a first tubular member 12 extending from the lower interior portion thereof to a first end of the invention A. A second tube 14 extends from a second end of the invention A to a third tubular leg 10 of the tee G.

When the PUC valve F is in the open position a negative pressure is impressed within the tee G to cause vapor in the crankcase E to be drawn into the line D to mix with air entering the carburetor C, which air subsequently mixes with fuel to be discharged into the combustion zones (not shown) of the engine as a fuel-air mixture. The negative pressure within the tee G is transmitted into the second tube 14 of the invention A, and this decreased pressure results in a mist of water being discharged into the second tube 14 to subsequently mix with the air-fuel mixture and absorb heat from the latter to be transformed into water vapor prior to entering the zones of combustion.

The water vapor upon entering the zones of combustion (not shown) in the engine combine with carbon monoxide formed therein as well as free carbon that may be present in the zones of combustion to form carbon dioxide and hydrogen. The hydrogen so formed combines with oxygen in the air-fuel mixture to form water, and the water so formed again combines with carbon monoxide and carbon to produce additional carbon dioxide and hydrogen. The introduction of the water vapor into the zones of combustion minimizes the quantity of pollutants in the exhaust from the engine due to the carbon monoxide being transformed into carbon dioxide.

Thus, the efficiency of the engine is increased by the discharge of water vapor into the zones of combustion due to the water vapor effecting a more complete combustion of the air-fuel mixture and the water vapor also combining with free carbon that may be disposed on spark plugs or on the interior portion of the engine that defines the zones of combustion to transform such carbon into carbon dioxide that is discharged from the engine.

From the above description it will be seen that the water vapor serves a two fold purpose, namely, lowering the carbon monoxide content of the exhaust from the engine and increasing the efficiency of the engine by removing free carbon therefrom, as well as effecting a more complete combustion of the air-fuel. The reaction by which water vapor transforms carbon monoxide to carbon dioxide and carbon to carbon dioxide and hydrogen are set forth below:

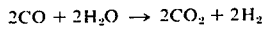

$$2CO + 2H_2O \rightarrow 2CO_2 + 2H_2$$

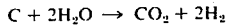

$$C + 2H_2O \rightarrow CO_2 + 2H_2$$

Figure 3:
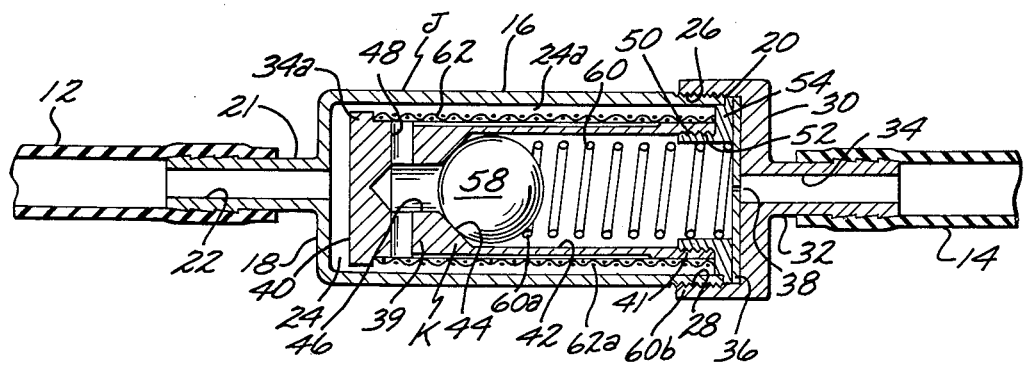
FIG. 3 is a longitudinal cross sectional view of the invention taken on the line 3-3 of FIG. 2.

In detail, the structure of the invention may best be seen in FIG. 3. The invention A includes a housing assembly J that is defined by an elongate cylindrical cup 16 that has a first closed end 18 and a second end 20 that is open. The first end 18 has a first tubular boss 21 projecting therefrom, which boss defines a first opening 22 within the interior thereof that is at all times in communication with a confined space 24 within the housing assembly J. The first boss 20 is connected to the first tubular member 12 that extends from the water reservoir H.

The cup 16 has external threads 26 formed thereon adjacent the second open end 20. The threads 26 are removably engaged by threads 28 formed in the interior of a cap 30, which cap has a second tubular boss 32 extending outwardly therefrom. The second boss 32 defines a second opening 34 within the confines thereof. The second boss 32 is connected to the second tubular member 14 as may be seen in FIG. 3.

A plate 36 is removably positioned within the cap 20, with the plate having an orifice 38 formed therein that is at all times in communication with the second opening 34.

A spring loaded valve assembly K is provided and occupies a fixed position in the confined space 24. Valve assembly K includes an elongate valve body 39 that has a first end 40 and a second end 41. An elongate cavity 42 extends into valve body 3 from the second end 41 thereof, with the cavity 42 as it approaches the first end 40 developing into a tapered valve seat 44 that is in communication with a second cavity 46 that extends towards first end 38. The second cavity 46 as it approaches first end 40 intersects a transverse passage 48 formed in the valve body 39. The valve body 39 is of such transverse area that it cooperates with the interior of the cup 16 to define an annulus space 24a therebetween as best seen in FIG. 3. The interior of the first cavity 42 has threads 50 formed therein, that engage threads 52 formed on an outwardly extending portion of a ring shaped flange 54.

The valve body 39 and the plate 36 are held in a fixed position in the assembly J when the cap 30 is threaded onto the cup 16, with the second end 20 of the cup 16 and the cap 30 then removably gripping the flange 54 and plate 36 therebetween as can be best seen in FIG. 3. A ball 58 of greater diameter than the second cavity 46 is situated in the first cavity 42, and the ball at all times being urged into sealing contact with seat 44 by a compressed helical spring 60. The spring 60 has a first end 60a in abutting contact with the aperture defining plate 36. A porous membrane 62 in the form of a cylindrical shell extends around the exterior surface of the valve body 36, and is illustrated in FIG. 3 as extending between the flange 54 and a circumferentially extending rib 39a formed on the valve body 39 adjacent the first end 40 thereof. The membrane 62 defines pores 62a therein that are of smaller cross section than that of the aperture 38 to be certain that solid particles (not shown) that may be entrained in the water (not shown) from the reservoir H will be trapped on the exterior surface of the membrane, and will not pass to positions where the foreign particles can obstruct the orifice, 38. The use and operation of the invention has been described previously in detail and need not be repeated.

I claim:

1. In combination with an internal combustion engine that has a carburetor with an air intake, which carburetor delivers an air-fuel mixture to said engine, a device for supplying water to said air-fuel mixture when said engine is operating to lessen the content of carbon monoxide in the exhaust from said engine, said device including:
    a. a vented reservoir for water;
    b. first tubular means connected to the interior of said reservoir;
    c. a housing assembly that includes an elongate cup that has a first closed end and a second end that is open, a cap that removably closes said second end, said first end and said cap having first and second openings therein, and said first opening connected to said first tubular means;
    d. second tubular means connecting said second opening to said air intake of said carburetor;

e. an orifice defining plate removably held in said housing assembly adjacent said cap;

f. spring loaded valve means that occupy a fixed position in said housing and allow water to flow from said first tubular means through said valve means to said orifice only when said air inteke effects a negative pressure in said second tubular means that is so related to the size of said orifice and the pressure within said housing that said water as it discharges from said orifice is in the form of a high velocity stream of mist containing a plurality of minute globules of water that are converted to water vapor as they flow through said second tubular means to mix with said air-fuel mixture by extracting heat from the latter, said water vapor when entering the zones of combustion in said engine with said air-fuel mixture combining with carbon monoxide and free carbon therein to form carbon dioxide and hydrogen, which hydrogen subsequently combines with oxygen in said air-fuel mixture to form water that repeats the above cycle prior to the products of combustion from said zones being discharged to the ambient atmosphere as exhaust said spring loaded valve means including:

1. an elongate valve body of less transverse cross sectional area than the interior of said cup, said valve body having first and second ends, a first cavity that extends longitudinally into said valve body from said second end thereof to develop into a tapered valve seat that is in communication with a second cavity, said second cavity in communication with a transverse passage defined in said valve body;
2. a ball longitudinally movable in said first cavity; and
3. a compressed helical spring that has a first end in contact with said ball and a second end in contact with said orifice defining plate, said spring maintaining said ball on said seat until said negative pressure in said second tubular means reduces the pressure in said first cavity to the extent that said ball moves from said seat to permit water from said first tubular means to flow through said passage, second cavity, valve seat and first cavity to discharge from said orifice as said stream;

g. first means for removably holding said spring loaded valve means and said orifice defining plate in fixed positions in said housing; and h. second means for removing solid particles entrained with water from said reservoir, prior to said water flowing through said orifice, which particles are of sufficient size to obstruct said orifice by lodging therein.

2. A device as defined in claim 1 in which said first means includes:

1. a circular flange secured to said first end of said valve body and in abutting contact with said plate, and said flange being pressured contacted by said second end of said cup when said cap is rotated to a tightened position on said cup.

3. A device as defined in claim 1 in which said second means is a porous membrane that extends around said valve body and covers the entrance to said passage.

* * * * *